United States Patent
Harris

[15] 3,661,220
[45] May 9, 1972

[54] WEIGHING DEVICE FOR LOGGING TRUCKS OR THE LIKE

[72] Inventor: Carl R. Harris, Kirkland, Wash.
[73] Assignee: Electro Development Corporation, Lynnwood, Wash.
[22] Filed: Nov. 1, 1971
[21] Appl. No.: 194,273

[52] U.S. Cl. ..........................177/136, 177/211, 73/141 A
[51] Int. Cl. .........................................................G01g 19/08
[58] Field of Search ........................177/136, 211, 229, 255; 73/141 A

[56] References Cited

UNITED STATES PATENTS

| | | | |
|---|---|---|---|
| 3,322,220 | 5/1967 | Bash | 177/211 X |
| 3,439,761 | 4/1969 | Laimins | 177/211 |
| 3,447,117 | 5/1969 | Duffield | 73/141 A X |
| 3,603,418 | 9/1971 | Schmidt et al. | 177/136 |
| 3,548,650 | 12/1970 | Boadle | 73/141 X |

FOREIGN PATENTS OR APPLICATIONS

| | | | |
|---|---|---|---|
| 650,822 | 10/1962 | Canada | 177/211 |

*Primary Examiner*—Stephen J. Tomsky
*Assistant Examiner*—George H. Miller, Jr.
*Attorney*—Christensen & Sanborn

[57] ABSTRACT

A load cell system including a strain gage mounting assembly to be located between the bolster and frame of a truck such as used in the logging industry. A heavy steel block having longitudinal slots cut therein is secured to the bolster to transmit forces to the frame in a manner such that a sensing beam is created. Sensing devices secured to the assembly respond to stresses of the beam to provide force indications to an indicator which shows the weight of the load on the truck.

7 Claims, 7 Drawing Figures

PATENTED MAY 9 1972

3,661,220

SHEET 1 OF 2

WEIGHING DEVICE FOR LOGGING TRUCKS OR THE LIKE

In the trucking industry a problem has long existed regarding the ability of determining the load on the vehicle. A prime example of the problem encountered relates to the logging industry. Loggers typically load the truck in a forest area but then must travel highways where weight restrictions are imposed. Severe penalties are applied which can lead to sufficient concern to cause the logger to fail to load his truck to the maximum for fear of having the sanctions of an overload applied to him. However, in order to make each trip the most profitable, it is essential that the truck be loaded to the maximum capacity without exceeding the load restrictions.

A particular problem exists when the load might shift due to travel over rough or curved roads. In spite of such rough terrain and conditions, it is essential that the equipment retain its integrity and be capable of accurately displaying to the driver the load and load distribution on the tractor and trailer assemblies.

It is therefore an object of the present invention to provide an improved weighing system for vehicles. A more specific object of the invention is to provide an accurate weight indicating system for use with logging trucks. Another object of the present invention is to provide a strain gage support assembly for use with truck weighing systems.

In accordance with the teachings of the present invention, a steel block of a generally rectangular configuration is adapted for mounting in a horizontal plane between the frame and bolster of a truck, one such assembly being located above each set of wheels on the vehicle. Horizontal slots cut in the block create a beam to which the truck load is transferred. Strain gages on the beam then provide electrical signals indicative of the load being imposed on the beam. A conventional weight indicating system coupled with the strain gages then provides an accurate indication of the vehicle load.

The above and additional objects and advantages of the invention will more clearly be understood from the following description when read with reference to the accompanying drawings, in which.

Figure 1:
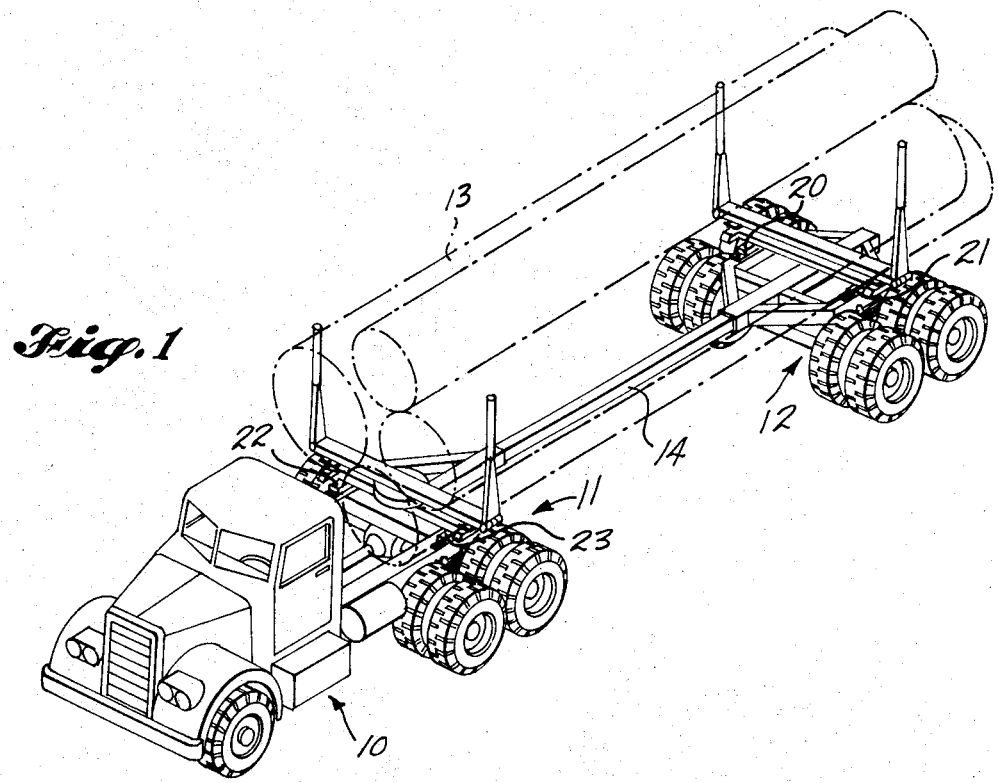
FIG. 1 is an illustration of a typical logging truck arrangement embodying the teachings of the present invention.

Turning now to the drawings, a logging truck 10 is shown as including a set of tractor wheels 11 and trailer or "truck" wheel assemblies 12 with logs 13 spanning the two and held in position by the usual stake and cable assemblies. An elongated beam 14 interconnects the tractor and trailer wheels in a manner conventional in the art. The apparatus of FIG. 1 is provided with four separate sensors or strain gage assemblies indicated generally at 20 and 21 above the rear wheel assemblies of the trailer and at 22 and 23 on the tractor wheel assemblies. As seen diagrammatically in FIG. 7, the left rear and right rear strain gage assemblies 20 and 21, as well as the left front and right front strain gage assemblies 22 and 23, are provided with output electrical leads 20A, 21A, 22A and 23A, with these leads being connected to a sensitivity and zero adjust circuit 25. The output circuit 25A leads to a conventional digital indicator assembly 26 which provides an indication to the driver of the load appearing either on each of the individual strain gage assemblies or preferably with a composite signal representing the weight on the assemblies 20 and 21 and a composite indication of the load on the assemblies 22 and 23 or a composite signal representing the total weight on all four assemblies. The indicator apparatus is conventional in the art, and accordingly further details are not included herein. The apparatus is calibrated so that direct indications in pounds or multiples thereof are provided to the driver.

Figure 2:
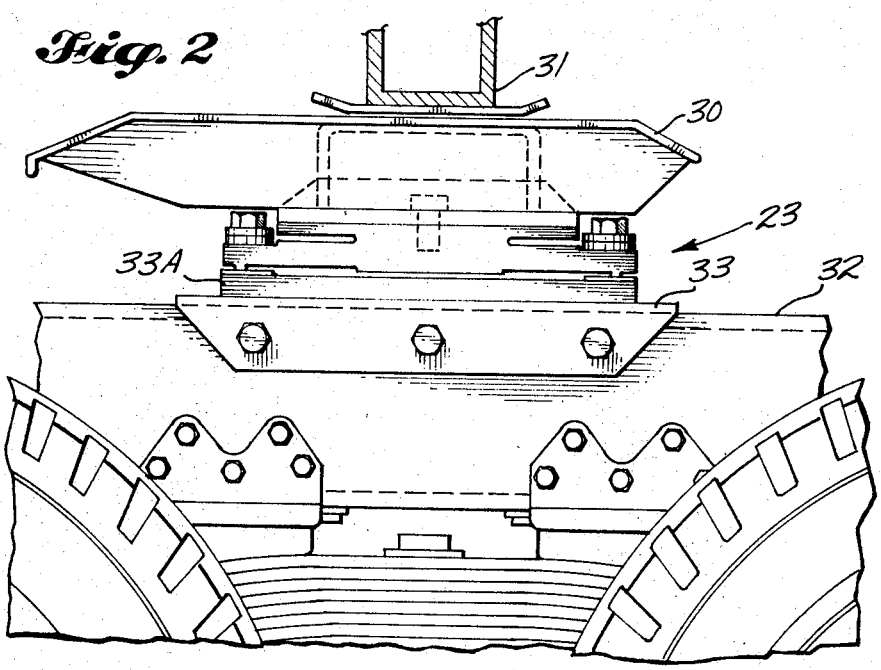
FIG. 2 is an enlarged side elevation of a preferred embodiment of the invention in position on the tractor portion of a logging truck.
Figure 3:
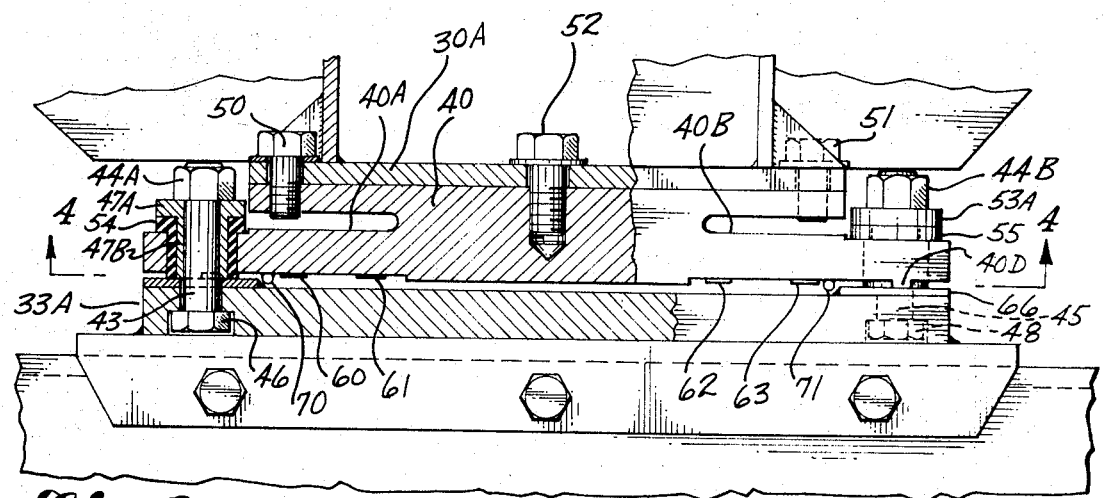
FIG. 3 is an enlarged sectional view showing construction details of the apparatus of FIG. 2.
Figure 4:
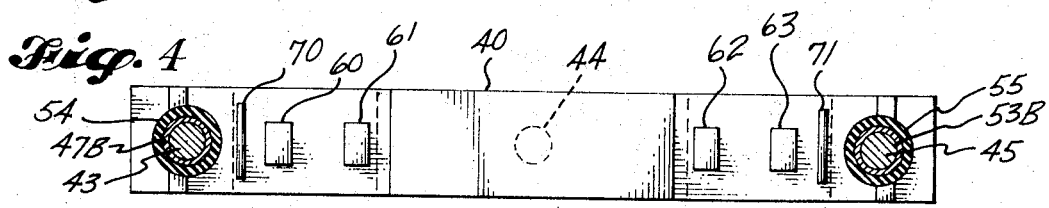
FIG. 4 is a cross-sectional view along the lines 4—4 in FIG. 3.
Figure 6:
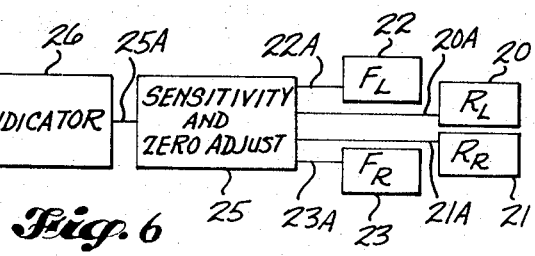
FIG. 6 is a block diagram of an indicator useful with the invention.

As seen in FIG. 2, the truck 10 has the usual bolster assembly 30 to which a front log support frame 31 is attached. The apparatus in FIG. 2 corresponds to the tractor portion of the truck, with the main steel frame 32 being shown. The steel frame 32 has a mounting bed assembly 33 rigidly bolted and/or welded to the main frame 32. The bed 33 has a flat portion 33A on which the beam assembly of the present invention is mounted. As seen most clearly in FIGS. 3 and 4, the beam assembly includes a cast or machined body 40 having longitudinal slots 40A and 40B either machined or cast therein. The mounting bed 33A is in the form of a flat steel plate to which two vertical studs 43 and 45 are secured (preferably by welding). As seen in FIG. 3, the heads of the studs 43 and 45 are recessed in the openings 46 and 48 with the studs then extending vertically from the support plate. The support plate 33A is welded around the entire periphery thereof to the truck frame or, as seen in FIG. 2, to the angle iron member 33, which is bolted to the truck frame 32.

The studs 43 and 45 extend through the two holes provided in the load cell block assembly 40. Studs 43 and 45 together with the nuts 44A, 44B illustrated in FIG. 3 serve to hold the load cell block assembly 40 onto the support plate 33A. The compression of block 40 is limited by steel members 47, 53 having spacer portions 47A, 53A surrounding studs 43 and 45 and integral cap portions 47B, 53B. Layers 54, 55 of a resilient rubber-like material, such as polyurethane, are formed on members 47, 53 and contact corresponding surfaces of block 40 in assembly. The resilient material allows the block 40 to flex freely so that the beams thereof always bend in the same way with applied force, thereby improving system accuracy.

The studs 50, 51 and 52 on the opposite ends and center of the bolster plate 30A serve to rigidly secure the bolster 30 to the load cell block assembly 40.

It will be observed that an open space exists between the support plate 33A and the lower central portion of the load cell block 40, so that a beam is defined at each end of the load cell block 40 due to the slots 40A and 40B. Strain gage assemblies 60, 61, 62, and 63 are illustrated as being located on the lower portion of the beams thus defined. Each strain gage assembly is well known in the art and comprises conventional constantan grids bonded in position on the beams at the locations indicated. It will be observed that strain gages 60 and 61 are to the left of the bottom end of slot 40A and strain gages 62 and 63 are to the right of the bottom end of the slot 40B.

It is well known in the art that if a beam is totally restrained at its end, then an S-beam condition is created. If the end is supported by a knife edge, then a cantilever beam results. When such a beam is instrumented near its support end and near the midpoint of the free end, it is known that the signal conditions differ, depending on whether an S-beam condition or a cantilever beam condition exists. However, in the system of the present invention, double instrumentation is utilized to avoid the question of signal condition being dependent upon the type of support. Conventional load cells use strain gages on opposite sides of the beam, that is, above and below the beam. By placing two strain gages, such as gages 60, 61, on the same beam surface, such as below the beam in FIG. 3, the output signal is not affected by changes in beam condition upon bending and represents instead the applied force component multiplied by the distance between the gages on the beam surface.

Figure 5:
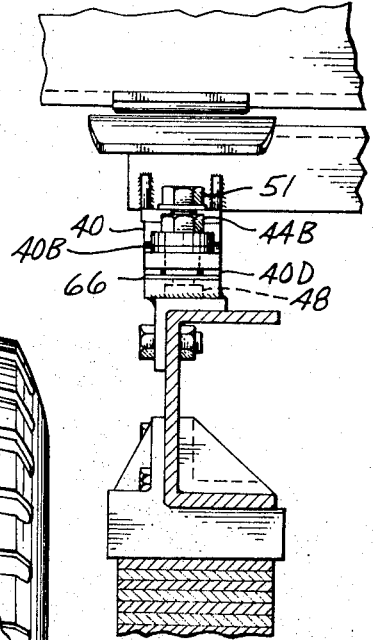
FIG. 5 is a rear view of the apparatus shown in FIG. 2.

As seen most clearly in FIG. 5, the end of the beam defined by the slot 40A and lower edge of the load cell assembly rests on a bearing plate 65 which is made of a very hard steel and is welded to the support plate 33A. A similar bearing plate 66 is located at the right end of the beam. The beam assembly itself is provided with an elongated support section 40C which runs the full width of the load cell block assembly. A similar support section 40D is at the rear end (right end in FIG. 3) of the load cell block assembly 40. Thus, an arrangement is provided which approximates a knife edge support when the beam is under stress due to bending of the beam and yet, when the beam is not under stress, a flat support is provided by the sections 40C and 40D.

It has been found in practice that the two slots shown act as relief sections, in that they relieve the end points of the block 40 and thus create a beam. Thus, the problem inherent in the weighing of a log truck due to the force being located over a large area is solved. With the arrangement illustrated, a low profile is achieved, and hence a desired low height at the support point is maintained. It should also be noted that by having the load cell 40 located immediately adjacent (but spaced slightly away from) the support plate 33A, the center portion of the block 40 can limit when an excess load is applied or, if during travel, a bump is encountered causing complete bending of the beam to its limit. In this manner, destruction of the assembly is avoided.

In practice the apparatus includes trimming resistors 70 and 71 (FIG. 4) mounted on the bottom sections of the beams immediately adjacent the strain gages 60–63. In this manner the assemblies 20, 21, 22 and 23 are trimmed to have the same sensitivity, and therefore it does not matter which assembly gets the major load during usage of the equipment. Also, each end of each cell is trimmed to have the same sensitivity, so that a flexing of the truck and trailer assembly, which may apply all or any part of the force to either end of the cell, does not affect the accuracy. That is, if the assemblies are not trimmed to the same sensitivity, then shifting of the load could create errors in the readout. However, by trimming the assemblies to the same sensitivity, the load's shifting during travel does not affect the overall accuracy, since the load simply shifts from one load cell to another, or from one end of a cell to the other.

Figure 7:
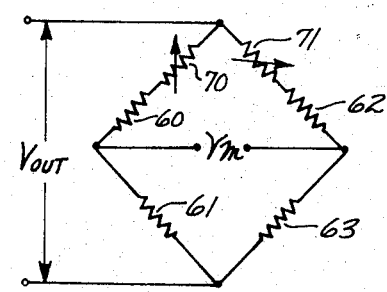
FIG. 7 is a schematic diagram showing typical connections for the strain gages and trimming resistors of one sensor.

With reference to FIG. 7, the electrical connections of the gages 60, 61, 62 and 63 and the trimming resistors 70, 71 are shown. To calibrate the sensor, a test weight is first placed on the end of the beam of block 40 below slot 40A, and resistor 70 adjusted so that a certain output signal is obtained. Then, this test weight is removed and placed on the end of the second beam of block 40, below slot 40B, and resistor 71 adjusted so that the same output signal is obtained.

In practice it has been found that the accuracy of the system greatly exceeds that heretofore known in the art. The strain gage and trimming resistor assemblies can be recessed into the lower portion of the load cell block 40 with the cavity thus created being filled with a potting compound in order to protect the assembly during usage. Alternatively, the equipment can make use of a potting compound to completely encase the space between the lower portion of the cell block 40 and the support plate 33A. Such potting compound has not been illustrated herein in order to make clear the important structural features of the assembly.

Each of the three additional strain gage assemblies 20, 21, 22 located above the other three wheel assemblies on the truck of FIG. 1 correspond in principle to that illustrated in detail for assembly 23 in the drawings (FIGS. 2–7).

There has thus been disclosed an improved and novel truck weighing system and particularly a block and strain gage assembly creating a unique beam arrangement for disposition between the frame and load carrying portion of a logging truck. In the particular embodiment illustrated, the support sections 40C and 40D act as knife edges on the hardened steel pads 65 and 66 so that a knife edge type support results when the assembly is under actual usage and yet a flat face-to-face support is provided when there is no load. By additionally having the ends of the load cell block 40 resiliently mounted to the support plate 33A through elements 43, 45, 47, 53, 54, and 55, it is found that a highly accurate weighing system results.

What is claimed is:

1. A strain gage assembly for a truck weighing system adapted to be located between the load carrying portion of the vehicle and the vehicle frame, comprising in combination: an elongated steel block having slots cut in the opposite ends thereof substantially parallel to the vehicle frame, and including edge support surfaces at the opposite ends thereof for maintaining the central portion of the block elevated above the truck frame and defining beam means responsive to loads imposed on the upper surface of the assembly; and strain sensing means located along a longitudinal surface of said block and responsive to strain induced in said assembly by the loads imposed thereon.

2. An assembly as recited in claim 1, further comprising means for securing said block to the vehicle frame, said means including means defining apertures at both ends of said block, said apertures passing through the portions thereof below said slots, fastening means affixed to said vehicle frame which extend through said apertures, said fastening means including a layer of resilient material for permitting free movement of said block in response to applied loads.

3. An assembly as recited in claim 1, further comprising bearing support plates inserted between said edge support surfaces and the vehicle frame.

4. An assembly as recited in claim 1, wherein said strain sensing means comprises a pair of strain gages located on the bottom surface of said block below each of said slots.

5. An assembly as recited in claim 4, further comprising means connecting the strain gages in each of said pairs in opposition to provide signals proportional to the load on each end of said block, and means adding said signals to provide an output signal.

6. An assembly as recited in claim 5, further comprising a trimming resistance means connected in circuit with each of said strain gage pairs, said trimming resistance means being adjustable to equalize said signals with equal applied loads on the ends of said block.

7. A truck weighing system comprising:
 a. a plurality of load sensors, each load sensor located between a load carrying portion of the truck and a corresponding portion of the vehicle frame, and each load sensor including a strain gage assembly comprising an elongated steel block having slots cut in the opposite ends thereof substantially parallel to the vehicle frame, and including edge support surfaces at the opposite ends thereof for maintaining the central portion of the block elevated above the truck frame and defining beam means responsive to loads imposed on the upper surface of the assembly; and strain sensing means located along the lower surface of said block and responsive to strain induced in said assembly by the loads imposed thereon;
 b. means coupled to said strain sensitive means including means for providing an output signal proportional to the load supported by said load carrying portions; and
 c. indicator means responsive to said output signal for displaying the value of said load.

* * * * *